(12) United States Patent
Seng et al.

(10) Patent No.: US 10,960,352 B2
(45) Date of Patent: Mar. 30, 2021

(54) CATALYST BED AND METHOD FOR REDUCING NITROGEN OXIDES

(71) Applicant: SHELL OIL COMPANY, Houston, TX (US)

(72) Inventors: Guido Seng, The Woodlands, TX (US); Wassim Klink, Sugar Land, TX (US); Wenzhong Zhang, Katy, TX (US); Andreas Klemt, Leuna (DE); Paul Benjerman Himelfarb, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 3 days.

(21) Appl. No.: 16/064,169

(22) PCT Filed: Dec. 20, 2016

(86) PCT No.: PCT/US2016/067648
§ 371 (c)(1),
(2) Date: Jun. 20, 2018

(87) PCT Pub. No.: WO2017/112613
PCT Pub. Date: Jun. 29, 2017

(65) Prior Publication Data
US 2019/0001266 A1  Jan. 3, 2019

Related U.S. Application Data

(60) Provisional application No. 62/270,865, filed on Dec. 22, 2015.

(51) Int. Cl.
*B01D 53/86* (2006.01)
*B01D 53/94* (2006.01)

(52) U.S. Cl.
CPC ..... *B01D 53/8631* (2013.01); *B01D 53/8625* (2013.01); *B01D 53/9409* (2013.01); *B01D 53/9431* (2013.01); *B01D 2255/20723* (2013.01); *B01D 2255/20769* (2013.01); *B01D 2255/20776* (2013.01); *B01D 2255/90* (2013.01); *B01D 2255/9155* (2013.01); *B01D 2255/9205* (2013.01)

(58) Field of Classification Search
None
See application file for complete search history.

(56) References Cited

U.S. PATENT DOCUMENTS

| | | | |
|---|---|---|---|
| 3,111,396 A | 11/1963 | Ball | |
| 4,027,476 A * | 6/1977 | Schmidt | B01J 35/02 60/218 |
| 4,031,185 A | 6/1977 | Akimoto et al. | |
| 4,044,102 A | 8/1977 | Muraki et al. | |
| 4,314,913 A * | 2/1982 | Derrien | B01D 53/8628 502/354 |
| 4,446,250 A | 5/1984 | Niwa et al. | |
| 4,617,289 A | 10/1986 | Saito et al. | |
| 4,663,300 A | 5/1987 | Lester et al. | |
| 4,780,290 A * | 10/1988 | Curtius | B01D 53/508 423/244.07 |
| 5,413,699 A | 5/1995 | Chou | |
| 5,536,477 A * | 7/1996 | Cha | B01D 53/32 422/171 |
| 6,117,405 A * | 9/2000 | Frey | B01D 53/8625 423/210 |
| 6,125,629 A * | 10/2000 | Patchett | B01D 53/9431 60/286 |
| 6,419,889 B1 | 7/2002 | Boxhoorn et al. | |
| 6,562,749 B1 * | 5/2003 | Lednor | B01J 35/04 502/66 |
| 7,062,904 B1 * | 6/2006 | Hu | F01N 3/035 60/286 |
| 7,255,848 B2 | 8/2007 | Deluga et al. | |
| 7,506,504 B2 | 3/2009 | Kumar | |
| 9,475,002 B2 * | 10/2016 | Boorse | B01D 53/944 |
| 2004/0118747 A1 | 6/2004 | Cutler et al. | |

(Continued)

FOREIGN PATENT DOCUMENTS

| CN | 1046473 A | 10/1990 |
|---|---|---|
| CN | 101172257 A | 5/2008 |

(Continued)

OTHER PUBLICATIONS

Masuda, Senichi, et al. "Electrostatic Precipitation of Carbon Soot from Diesel Engine Exhaust". IEEE Transactions on Industry Applications. vol. 1A-19, No. 6, Nov./Dec. 1983 (Year: 1983).*
Richardson, J.T. et al. "Properties of ceramic foam catalyst supports: pressure drop". Applied Catalysis A: General 204, 19-32 (2000). (Year: 2000).*
International Search Report and Written Opinion received for PCT Patent Application No. PCT/US2016/067651, dated Apr. 12, 2017, 13 pages.

(Continued)

*Primary Examiner* — Sheng H Davis

(57) ABSTRACT

A catalyst bed comprising a ceramic or metallic foam comprising one or more NOx reduction catalysts is described. Further, a method for reducing the concentration of NOx in a dust containing gas stream comprising: a) passing a first gas stream containing NOx into a contacting zone; b) contacting the first gas stream with a ceramic or metallic foam catalyst bed having one or more flow paths through the catalyst bed wherein the ceramic or metallic foam comprises a NOx reduction catalyst to produce a second gas stream with a reduced NOx concentration; and c) passing the second gas stream out of the contacting zone wherein the first gas stream has a dust concentration of at least 5 mg/Nm3 and the second gas stream comprises at least 50% of the amount of dust in the first gas stream.

16 Claims, 2 Drawing Sheets

(56) References Cited

U.S. PATENT DOCUMENTS

| | | |
|---|---|---|
| 2004/0219084 A1 | 11/2004 | Hall et al. |
| 2005/0159292 A1* | 7/2005 | Pham .................. C04B 38/0032 |
| | | 501/80 |
| 2007/0009401 A1 | 1/2007 | Kolbeck et al. |
| 2007/0144828 A1 | 6/2007 | Galligan |
| 2009/0142243 A1* | 6/2009 | Eiteneer .................. F23J 15/003 |
| | | 423/239.1 |
| 2010/0284875 A1* | 11/2010 | Koermer ............ B01D 53/9409 |
| | | 423/237 |
| 2013/0034477 A1* | 2/2013 | Heidenreich ...... B01D 53/8631 |
| | | 422/630 |
| 2014/0050626 A1* | 2/2014 | Heidenreich ........ B01D 53/885 |
| | | 422/139 |
| 2015/0030515 A1* | 1/2015 | Deuerlein .......... B01D 53/8628 |
| | | 423/212 |
| 2015/0182974 A1 | 7/2015 | Gao et al. |
| 2016/0045868 A1* | 2/2016 | Sonntag .................. B01J 21/06 |
| | | 423/213.2 |
| 2018/0369753 A1 | 12/2018 | Klink et al. |
| 2018/0369800 A1 | 12/2018 | Klink et al. |

FOREIGN PATENT DOCUMENTS

| | | |
|---|---|---|
| CN | 101287550 A | 10/2008 |
| CN | 202270481 * | 6/2012 |
| CN | 105289676 A | 2/2016 |
| JP | S5710319 A | 1/1982 |
| JP | H05154352 A | 6/1993 |
| JP | 2006205091 A | 8/2006 |
| JP | 2006212515 A | 8/2006 |
| WO | 2004089508 A1 | 10/2004 |
| WO | 2009083593 A1 | 7/2009 |

OTHER PUBLICATIONS

International Search Report and Written Opinion received for PCT Patent Application No. PCT/US2016/067655, dated Apr. 12, 2017, 11 pages.

International Search Report and Written Opinion received for PCT Patent Application No. PCT/US2016/067648, dated Apr. 6, 2017, 12 pages.

Cheng, "Rolling Regeneration Trap for Diesel Particulate Control", SAE Technical Paper Series, Journal of Fuels and Lubricants, vol. 112, Section 4, Oct. 27, 2003, pp. 2373-2380, XP055359369.

Mehta et al., "A Correlation for Soot Concentration in Diesel Exhaust Based on Fuel-air Mixing Parameters", Fuel, vol. 71, Issue No. 6, Jun. 1, 1992, pp. 689-692, XP025457526.

Walther et al., A New PM Process for Manufacturing of Alloyed Foams for High Temperature Applications Conference Paper, Oct. 2010, 8 pages.

* cited by examiner

CATALYST BED AND METHOD FOR REDUCING NITROGEN OXIDES

CROSS REFERENCE TO RELATED APPLICATIONS

This is a national stage application of International Application No. PCT/US2016/067648, filed 20 Dec. 2016, which claims benefit of priority to U.S. Application No. 62/270,865, filed 22 Dec. 2015.

FIELD OF THE INVENTION

The invention relates to a catalyst bed comprising a ceramic or metallic foam comprising one or more $NO_x$ reduction catalysts and a method for reducing the $NO_x$ concentration in a gas stream.

BACKGROUND OF THE INVENTION

Oxides of nitrogen are common by-products and/or desirable intermediates in a number of industrial processes, including the manufacture of chemicals, such as nitric acid, or combustion processes in air. Nitrogen oxides of the formula NO and NO2 are typically referred to together as $NO_x$. $NO_x$ is a large scale pollutant and significant efforts have been made for the reduction of $NO_x$ in exhaust gas streams from processes in which they are produced. Processes for removal of $NO_x$ from gas streams are generally referred to in the art as $DeNO_x$ processes and the catalysts used therein as $DeNO_x$ catalysts.

The prior art describes processes where the dust in a gas stream containing $NO_x$ that is to be treated is captured on the catalyst and then removed from the catalyst by cleaning or another means. For example, U.S. Pat. No. 4,044,102 describes a reactor that is effective for reducing nitrogen oxides and dust from a flue gas stream. The catalyst is passed in a moving bed such that it contacts with the gas and entrains the dust. The catalyst is then passed through an outlet where it is regenerated and the dust is removed. The patent teaches that dust is preferably removed from the gases prior to removal of $NO_x$ to prevent dust from accumulating on the surface of the catalyst bed and in the interstices between the catalyst particles.

As another example, U.S. Pat. No. 5,413,699 describes a reactor where a gas containing dust and $NO_x$ is passed through a catalyst bed at a sufficient velocity to fluidize the catalyst bed. Particulates deposited on the catalyst are abraided or elutriated away by fluidization to prevent fouling of the $deNO_x$ catalyst. The patent teaches that dust loadings of 10-50 $mg/Nm^3$ are too high to permit long service life of a commercially available $deNO_x$ catalyst.

In addition, a number of patents and published applications relate to the use of ceramic foams for treating diesel engine exhaust gases. For example, U.S. Pat. No. 5,536,477 describes a ceramic foam filter that has the capacity to trap substantially all soot present in the exhaust gas stream.

Fixed bed catalyst systems can provide the removal of $NO_x$ from process streams at lower temperatures due to their excellent activity; however, they also tend to trap a majority of the particulates in the gas stream and hence experience rapid pressure drop increases. On the other hand, honeycomb catalyst systems allow particulate matter to pass through easily, but they have much lower activity and therefore require much higher temperatures of operation. It would be preferred to provide a catalyst and a process that allowed for the efficient removal of $NO_x$ from particulate-containing gas streams at low temperatures while at the same time allowing a majority of the dust to pass through the catalyst bed and not be trapped on the catalyst.

SUMMARY OF THE INVENTION

The invention provides a catalyst bed comprising a ceramic or metallic foam comprising one or more $NO_x$ reduction catalysts.

The invention also provides a method for reducing the concentration of $NO_x$ in a dust containing gas stream comprising: passing a first gas stream containing $NO_x$ into a contacting zone; contacting the first gas stream with a ceramic or metallic foam catalyst bed having one or more flow paths through the catalyst bed wherein the ceramic or metallic foam comprises a $NO_x$ reduction catalyst to produce a second gas stream with a reduced $NO_x$ concentration; and passing the second gas stream out of the contacting zone wherein the first gas stream has a dust concentration of at least 5 $mg/Nm^3$ and the second gas stream comprises at least 50% of the amount of dust in the first gas stream.

DETAILED DESCRIPTION OF THE INVENTION

Figure 1:
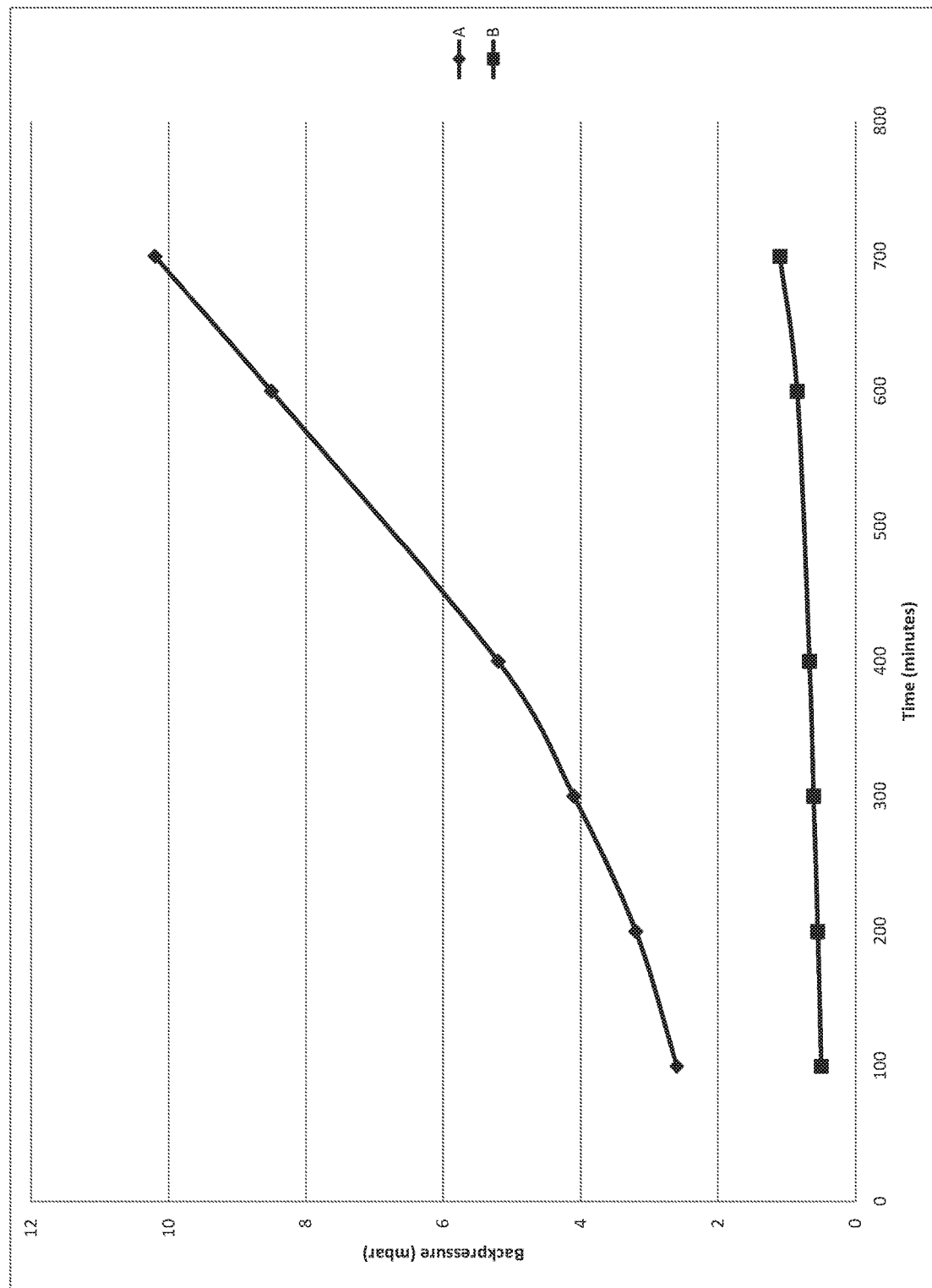
FIG. 1 displays the results of Example 1
FIG. 2 displays the results of Example 2

The ceramic or metallic foam catalyst bed of the present invention allows the dust in the gas stream to pass through while treating the gas to reduce $NO_x$. This catalyst is useful to treat exhaust gas from industrial complexes. The ceramic foams that have been described for use in emission control of automobile engines have high pores per inch to trap the soot and particulates. The foams of the present invention have lower pores per inch. The term "dust" as used herein comprises any small particulates that can potentially remain behind on the catalyst bed as the gas stream passes through.

The foam of the present invention allows the dust to pass through without plugging the catalyst bed while treating the exhaust gas to remove $NO_x$. The catalyst bed of the present invention is especially useful to treat exhaust gas from industrial processes, and stationary turbines.

The catalyst bed is designed such that a significant portion of the dust in the gas stream passes through the catalyst bed and exits with the second gas stream. The prior art teaches capturing the dust on the catalyst and provides a number of methods for removing the dust from the catalyst. In this invention, a significant portion of the dust is not trapped on the catalyst, thus giving a longer service life to the catalyst bed and eliminating the need for frequent dust removal, fluidization of the catalyst or other complex operations.

The ceramic foam may comprise any ceramic material that can provide sufficient strength and provides a suitable carrier for the $NO_x$ reduction catalyst. The ceramic foam preferably comprises cordierite, titanium oxide, alumina or mixtures thereof.

The metallic foam may, likewise, comprise any metallic material that can provide sufficient strength and is also a suitable carrier for the $NO_x$ reduction catalyst. The metallic foam preferably comprises nickel, iron, aluminum, chromium or alloys thereof.

In one embodiment, a ceramic foam may be made by filling the pores of a foamed polymer, for example, polyurethane, with an aqueous slurry of ceramic, for example, Al2O3, ZrO2. The slurry may contain 0.1 to 10 μm diameter particles in water, with appropriate amounts of wetting agents, dispersion stabilizers and viscosity modifiers. The wet foam is dried and calcined in air at temperatures above 1000° C. The polymer vaporizes or burns and the ceramic particles sinter. In another embodiment, the viscosity of the slurry may be increased by adding thickening agents. This method is further described in J. T. Richardson, Properties of Ceramic Foam Catalyst Supports: Pressure Drop, Applied Catalysis A: General 204 (2000) 19-32 which is herein incorporated by reference.

In one embodiment, a metallic foam may be made by a powder metallurgical process that converts nickel or iron foams into a high-temperature stable alloy. In this process, the nickel or iron foam is continuously unwound, coated first with a binder solution using a spraying technique and then with a high alloyed powder. After, the foam is cut into sheets of the desired size. This method is further described in G. Walther et al, A New PM Process for Manufacturing of Alloyed Foams for High Temperature Applications, PM 2010 World Congress—Foams and Porous Materials which is herein incorporated by reference.

The foam has a void space of at least 60%, preferably at least 70% and more preferably at least 80%. Void space is defined as the volume of the structure that is open divided by the total volume of the structure (openings and ceramic or metallic) multiplied by 100.

The ceramic and metallic foams have an interconnected internal tortuous pore structure. This may also be referred to as having a reticulated structure. This structure results in a flow of gases through the foam that is turbulent which leads to improved contact with the catalyst compared to the laminar flow inside honeycomb channels.

The tortuosity of the ceramic or metallic foam is preferably greater than 1.0, more preferably greater than 1.5 and most preferably greater than 2.0. Tortuosity may be calculated as the ratio of the length of the flow path taken by the gas through the ceramic or metallic foam divided by the length of the shortest straight line path from the inlet to the outlet of the ceramic or metallic foam. A straight channel path has a tortuosity of 1.0.

The ceramic or metallic foam has from about 5 to about 50 pores per inch, preferably from about 10 to about 30 pores per inch. The pores per inch of the foam impacts the ability of the foam to allow dust to pass through the catalyst bed.

In one embodiment, the metallic foam has a density in the range of from 0.4 to 0.75 g/cm3. This provides a lightweight foam that can be used to treat these gases.

Any $NO_x$ reduction catalyst may suitably be used in the process of the present invention, for example those described in U.S. Pat. No. 6,419,889. An exemplary catalyst from U.S. Pat. No. 6,419,889 comprises a titania carrier and one or more metal compounds selected from the group consisting of vanadium, molybdenum and tungsten. In one embodiment, the $NO_x$ reduction catalyst is a vanadium on titania catalyst. In another embodiment, the $NO_x$ reduction catalyst is a vanadium and tungsten on titania catalyst.

Other suitable catalysts include oxides of metals such as aluminum, copper, iron, cobalt, tin, chromium, nickel, manganese, titanium, silver, platinum, rhodium, palladium or mixtures thereof. The metal oxides may be supported on any conventional carrier or other material, for example, alumina, silicon-alumina, magnesia-alumina, titania, alumina, calcium oxide-alumina, chromium oxide-alumina, or silica-chromium oxide-alumina.

In addition, zeolitic catalysts containing copper or iron may be used for $NO_x$ reduction. One preferred example is iron-exchanged zeolite beta. The zeolitic catalyst may comprise other metals such as platinum, ruthenium, palladium, osmium, rhodium or mixtures thereof.

The catalyst may have a surface area measured by nitrogen adsorption of between about 70 $m^2$/g and about 150 $m^2$/g. The catalyst may have a bimodal pore distribution with more than 90% of the pore volume present in pores having a diameter of at most about 100 nm, where the pore volume is considered to be the pore volume present in pores having a diameter between about 1 nm and about 104 nm.

The catalyst can be made by impregnating or deposition of a carrier with the metal compound(s) after drying and calcining the carrier or after extruding, then drying and then calcining the carrier. The impregnation may be carried out by contacting the carrier with an aqueous solution of the metal compound(s). In one embodiment, a metal oxalate solution can be used for the impregnation. The catalyst can also be made by co-mulling the carrier along with metal compounds to form a solid mixture. The catalyst formed according to these methods can be ground or milled to a certain particle size distribution in a slurry before it is applied by coating on the ceramic or metallic foam.

Another method for adding the catalyst to the foam is deposition of the catalyst by pore volume impregnation of the carrier and then depositing the impregnated carrier on the foam. A further method comprises making a washcoat slurry of the metals, for example, titanium and vanadium and then depositing that on the foam.

The $NO_x$ reduction catalyst may also comprise a binder material which helps bind the catalyst to the support and/or to the ceramic or metallic foam.

The method for reducing the concentration of $NO_x$ in a particulate containing gas stream comprises passing a first gas stream containing $NO_x$ into a contacting zone. The gas stream may come from a number of sources including power plants, thermal cracking furnaces, incinerators, metallurgical plants, fertilizer plants and chemical plants. The gas stream comprises a significant level of dust.

The gas stream comprises at least 5 mg/$Nm^3$ of dust. The method of the present invention can handle gas streams with at least 10 mg/$Nm^3$ of dust. The method is capable of handling gas streams with at least 20 mg/$Nm^3$ of dust, preferably at least 30 mg/$Nm^3$ of dust and more preferably at least 70 mg/$Nm^3$ of dust.

The gas stream is contacted with a ceramic or metallic foam catalyst bed wherein the catalyst bed comprises a $NO_x$ reduction catalyst to produce a second gas stream. The catalyst bed has one or more flow paths through the catalyst bed that enables contact between the gas stream and the $NO_x$ reduction catalyst.

The reduction of $NO_x$ in the gas stream can occur at a pressure in the range of from 0 kPa to 1200 kPa and at a temperature in the range of from 100° C. to 400° C. The temperature is preferably in a range of from 100° C. to 350° C., more preferably of from 100° C. to 250° C. and most preferably of from 140° C. to 220° C.

Many catalysts require higher temperatures to achieve a high conversion of $NO_x$. It is preferred to use a catalyst that has high activity and selectivity at the temperatures described above so that lower temperatures can be used. Under the contacting conditions, the $NO_x$ reduction catalyst can remove at least a majority of the $NO_x$ by chemical conversion. The second gas stream contains at most 40% of the $NO_x$ present in the feed gas stream. This second gas stream contains at most 25% of the $NO_x$ present in the first gas stream, preferably at most 5% of the $NO_x$ present in the first gas stream and more preferably at most 1% of the $NO_x$ present in the first gas stream.

The second gas stream contains at least 50% of the dust that was present in the first gas stream that was fed to the catalyst bed. The second gas stream preferably comprises at least 60% of the dust that was present in the first gas stream and more preferably at least 80% of the dust that was present in the first gas stream.

EXAMPLES

Example 1

In this example, a fixed catalyst bed of deNOx catalyst pellets (A) and a fixed catalyst bed of ceramic foam deNOx catalyst (B) were tested to determine the effect of passing a gas stream with a high dust loading through the catalyst bed. The catalyst pellets were 3.2 mm trilobe shaped pellets. The ceramic foam deNOx catalyst had 18 pores per inch. The test was carried out in a dust filtration lab and comprised passing air containing dust at a concentration of 70 mg/Nm³ through the catalyst bed. The average particle size of the dust was 1 micron. The same particles and concentration were used to compare the two types of catalyst beds. The pressure drop across the catalyst bed at ambient temperature and pressure was measured. The results of this test are shown in FIG. 1 where the back pressure is plotted as a function of time in minutes during which the air stream containing dust was passed through the catalyst bed.

As can be seen from the figure, the ceramic foam catalyst initially had a lower backpressure than the catalyst pellets. Further, as the dust was passed through the catalyst beds, the backpressure of the ceramic foam increased only slightly, while the backpressure of the pellet catalyst increased rapidly to the maximum system design pressure. At this point, the catalyst pellets would have had to be cleaned before they could continue to be used.

In addition to measuring the backpressure, the amount of dust that passed through the ceramic foam catalyst bed was measured. Initially, when the testing started, 60% of the dust entering the ceramic foam passed through the catalyst bed. After the air stream had passed through the ceramic foam catalyst bed for a given time, the amount of dust passing through the foam was determined to be 64%. This example shows that the ceramic foam catalyst bed can be operated under high-dust conditions, and that the catalyst pellets cannot be operated effectively under high-dust conditions.

Example 2

Figure 2:
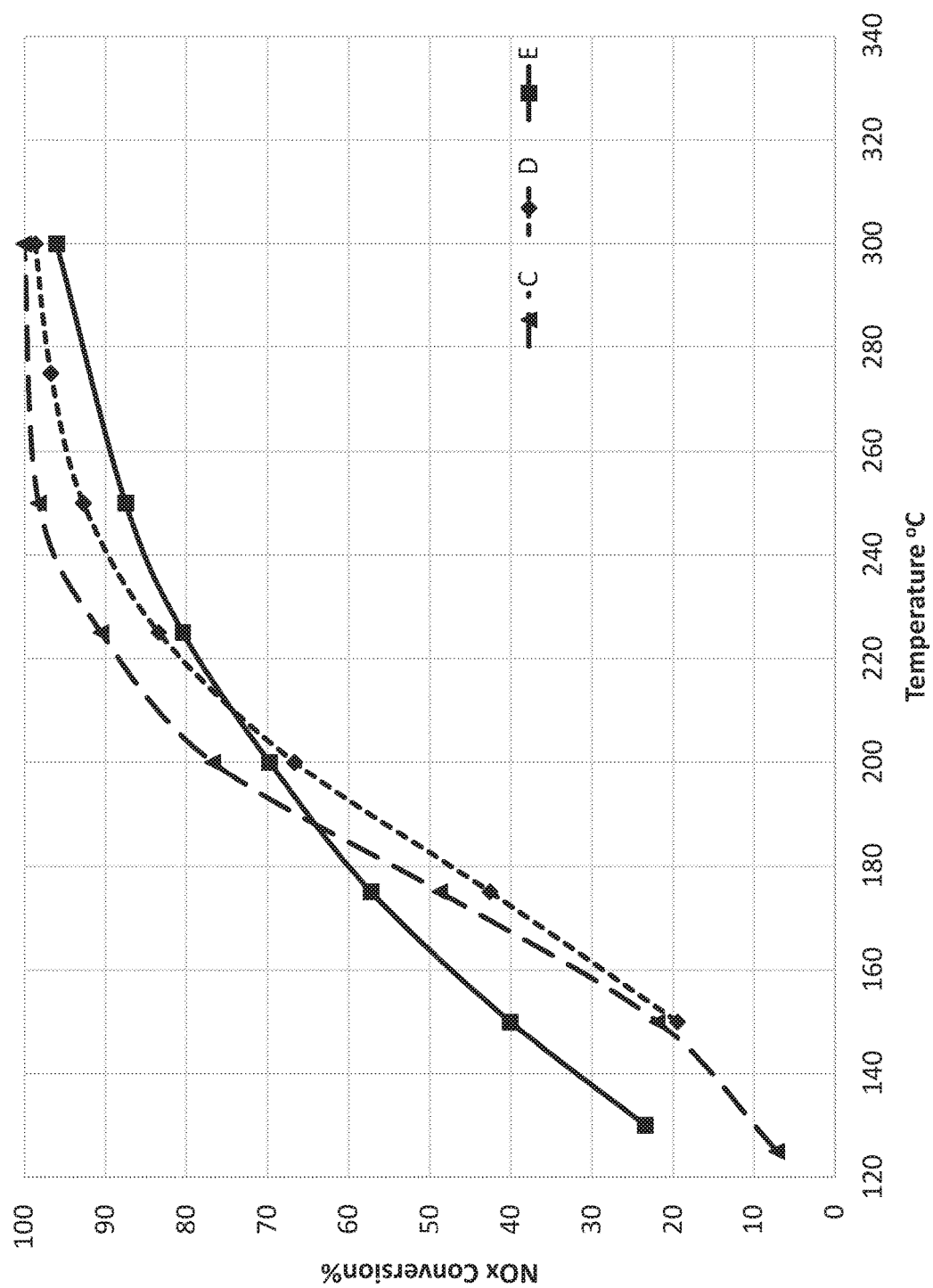

In this example, three catalysts were tested to determine their activity for $NO_x$ conversion. The first test (C) used a ceramic foam catalyst with 30 pores per inch. The second test (D) used a ceramic foam catalyst with 18 pores per inch. The third test (E) used 3.2 mm trilobe shaped catalyst pellets. The test was carried out in a fixed bed reactor with the same volume of catalyst loading for all three tests. The space velocity for all three tests was maintained at a constant 22,000 hr-1 and the tests were carried out at ambient pressure. The inlet gas composition was 300 ppm NH3, 200 ppm NO, 10% H2O, 7.5% O2 with the balance being nitrogen. The concentration of NO before and after the catalyst bed was monitored separately using an FTIR instrument. The results of the example are displayed in FIG. 2. As can be seen from the figure, ceramic foam has a comparable activity to the catalyst pellets and a higher activity than the catalyst pellets at higher temperatures.

These examples show that the ceramic foam catalyst can be used to effectively reduce the level of NOx in a gas stream, and further that the ceramic foam catalyst bed can be used under high-dust conditions.

That which is claimed is:

1. A method for reducing a concentration of $NO_x$ in a dust containing gas stream comprising:
    a. passing a first gas stream containing $NO_x$ into a contacting zone, wherein the first gas stream is generated from an industrial process;
    b. contacting the first gas stream with a catalyst bed having one or more flow paths through the catalyst bed wherein the catalyst bed comprises a ceramic or metallic foam catalyst having a $NO_x$ reduction catalyst configured to produce a second gas stream with a reduced $NO_x$ concentration; and
    c. passing the second gas stream out of the contacting zone, wherein the first gas stream has a dust concentration of at least 5 mg/Nm³ and the second gas stream comprises at least 50% of an amount of dust in the first gas stream.

2. The method of claim 1, wherein the first gas stream has a dust concentration of at least 10 mg/Nm³.

3. The method of claim 1, wherein the second gas stream comprises at least 60% of the amount of dust in the first gas stream.

4. The method of claim 1, wherein the contacting occurs at a temperature in the range of from 100 to 250° C.

5. The method of claim 1, wherein the ceramic or metallic foam catalyst has in the range of from about 5 to about 50 pores per inch.

6. The method of claim 1, wherein the ceramic or metallic foam catalyst has an interconnected internal tortuous pore structure providing flow paths through the catalyst bed that have a tortuosity of greater than 1.0.

7. The method of claim 1, wherein the ceramic foam catalyst comprises cordierite, titanium oxide or alumina.

8. The method of claim 1, wherein the metallic foam catalyst comprises nickel, iron or alloys thereof.

9. The method of claim 1, wherein the $NO_x$ reduction catalyst comprises vanadium, molybdenum, tungsten or mixtures thereof.

10. The method of claim 1, wherein the ceramic or metallic foam catalyst further comprises a binder material.

11. The method of claim 1, wherein the second gas stream comprises at least 80% of the amount of dust in the first gas stream.

12. The method of claim 1, wherein a density range of the ceramic or metallic foam catalyst is between 0.4 to 0.75 grams/cubic centimeter (g/cm³).

13. The method of claim 1, wherein the contacting occurs at a pressure range of from 0 kilopascals (kPa) to 1200 kPa.

14. The method of claim 1, wherein the $NO_x$ reduction catalyst has a surface area of between approximately 70 square meters/gram (m²/g) and approximately 150 m²/g.

15. The method of claim 1, wherein the $NO_x$ reduction catalyst comprises a bimodal pore distribution with more than 90% of a pore volume present in pores having a diameter of at most about 100 nanometers (nm).

16. The method of claim 15, wherein the pore volume is present in pores having a diameter of between approximately 1 nm and approximately 104 nm.

* * * * *